US 8,913,500 B1

(12) United States Patent
Gunduzhan

(10) Patent No.: US 8,913,500 B1
(45) Date of Patent: ***Dec. 16, 2014

(54) ELASTIC TRAFFIC MARKING FOR MULTI-PRIORITY PACKET STREAMS IN A COMMUNICATIONS NETWORK

(71) Applicant: Rockstar Consortium US LP, Plano, TX (US)

(72) Inventor: Emre Gunduzhan, Bethesda, MD (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/933,305

(22) Filed: Jul. 2, 2013

Related U.S. Application Data

(63) Continuation of application No. 13/459,645, filed on Apr. 30, 2012, now Pat. No. 8,498,209, which is a continuation of application No. 12/512,363, filed on Jul. 3, 2009, now Pat. No. 8,179,800, which is a continuation of application No. 11/142,125, filed on Jun. 1, 2005, now Pat. No. 7,586,848.

(60) Provisional application No. 60/577,634, filed on Jun. 7, 2004.

(51) Int. Cl.
*H04L 12/26* (2006.01)
*H04L 12/833* (2013.01)

(52) U.S. Cl.
CPC ..................................... *H04L 47/31* (2013.01)
USPC .......................................................... 370/235

(58) Field of Classification Search
USPC .................. 370/235, 432, 462, 351, 390, 399
See application file for complete search history.

(56) References Cited

U.S. PATENT DOCUMENTS

| | | | |
|---|---|---|---|
| 6,147,970 A | 11/2000 | Troxel | |
| 7,284,047 B2 | 10/2007 | Barham et al. | |
| 7,327,682 B2 | 2/2008 | Gandhi et al. | |
| 7,467,223 B2 | 12/2008 | Wu et al. | |
| 8,179,800 B1 | 5/2012 | Gunduzhan | |
| 8,498,209 B1 * | 7/2013 | Gunduzhan | 370/235 |

* cited by examiner

*Primary Examiner* — Mohammad Anwar
(74) *Attorney, Agent, or Firm* — Schmeiser, Olsen & Watts LLP

(57) ABSTRACT

Routers in a communications network mark packets of a multi-priority stream to establish a drop precedence of the packets during network congestion. For each packet received, a router employs one of two types of packet-marking mechanisms to associate low drop precedence with a high-priority, out-of-profile packet. One type, called "token bucket with loan bucket," uses a token bucket to determine whether a packet is in conformance, i.e., in-profile, with a traffic profile and at least one loan bucket to determine whether a high priority, out-of-profile packet may borrow bandwidth. Another mechanism type, called "token bucket with color-exchange queue," uses a color-exchange queue to delay packet forwarding for a fixed period. During this delay, a high-drop-precedence marking of an out-of-profile, high-priority packet may be exchanged with a low-drop-precedence marking of an in-profile, low-priority packet. The packet-marking mechanisms are useful in improving the quality of video viewing.

18 Claims, 13 Drawing Sheets

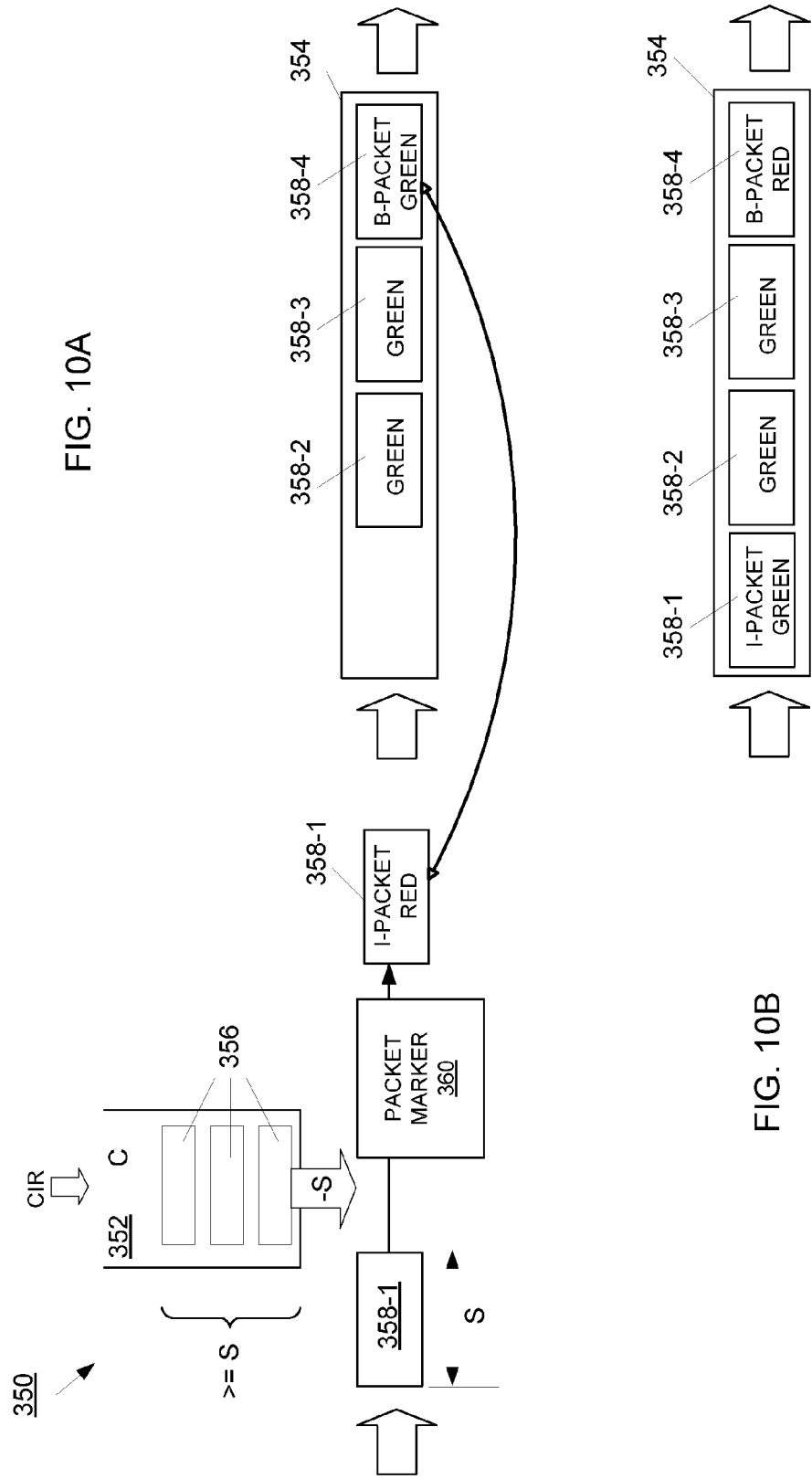

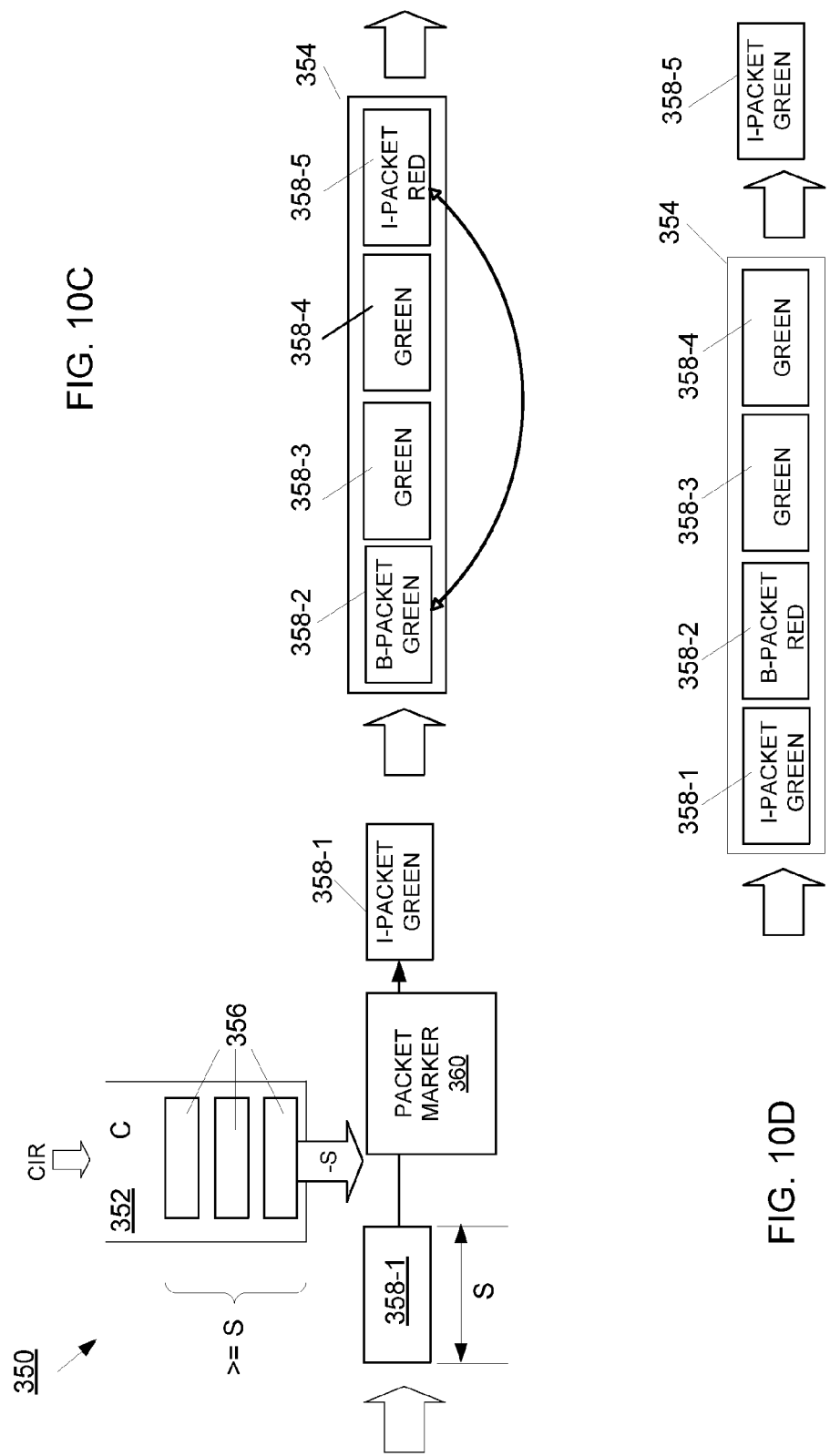

ELASTIC TRAFFIC MARKING FOR MULTI-PRIORITY PACKET STREAMS IN A COMMUNICATIONS NETWORK

CROSS-REFERENCE TO RELATED APPLICATIONS

This application is a continuation application claiming priority to and the benefit of the filing date of co-pending U.S. application Ser. No. 13/459,645, filed Apr. 30, 2012, titled "ELASTIC TRAFFIC MARKING FOR MULTI-PRIORITY PACKET STREAMS IN A COMMUNICATIONS NETWORK," which claims priority to the filing date of U.S. application Ser. No. 12/512,363, filed Jul. 30, 2009, issued on May 15, 2012 as U.S. Pat. No. 8,179,800 titled "ELASTIC TRAFFIC MARKING FOR MULTI-PRIORITY PACKET STREAMS IN A COMMUNICATIONS NETWORK," which claims priority to and the benefit of the filing date of U.S. application Ser. No. 11/142,125 filed Jun. 1, 2005 titled "ELASTIC TRAFFIC MARKING FOR MULTI-PRIORITY PACKET STREAMS IN A COMMUNICATIONS NETWORK," now U.S. Pat. No. 7,586,848, issued Sep. 8, 2009, which claims priority to and the benefit of the filing date of U.S. Provisional Application Ser. No. 60/577,634 filed Jun. 7, 2004, titled "ELASTIC TRAFFIC MARKING FOR MULTI-PRIORITY STREAMS WITH APPLICATIONS TO VIDEO TRANSPORT," the entireties of which applications are incorporated by reference herein.

FIELD OF THE INVENTION

The invention relates generally to communications networks. More specifically, the invention relates to a system and method for marking packets of multi-priority traffic streams to establish drop precedence for such packets during network congestion.

BACKGROUND

Emerging services, such as multimedia transmission and virtual private networks, require careful allocation of resources in an Internet Protocol (IP) network. To allocate sufficient resources for such services, service providers need to know the bounds for supporting offered traffic. A service level agreement (SLA) between a customer and a service provider specifies these bounds, which constitute a traffic profile. Usually, the traffic profile takes the form of several token-bucket parameters (e.g., committed information rate (CIR) and peak information rate (PIR)). Traffic that conforms to the bounds, referred to as in-profile traffic, must be serviced by the network according to the desired quality of service (QoS) specified in the SLA, whereas any excess traffic, referred to as out-of-profile traffic, is forwarded without any guarantees.

In general, the enforcement of an SLA occurs at the interface between different network domains. An edge router meters and marks incoming traffic to ensure that the traffic conforms to the traffic profile. Congestion control mechanisms inside a network domain use the result of the marking mechanism to determine which packets to drop during congestion. The metering mechanism is typically a variant of a token-bucket algorithm. For example, a two-color token bucket marks in-profile traffic as "green" and out-of-profile traffic as "yellow". As another example, a three-color token bucket marks in-profile traffic as "green", some out-of-profile traffic as "yellow", and other out-of-profile traffic as "red" according to a boundary specified in the SLA. Routers forward yellow traffic with a higher drop-precedence than green traffic. Routers can treat red traffic with a higher drop-precedence than yellow traffic or discard such traffic immediately.

Current marking mechanisms that enforce an SLA, however, focus on the arrival rate and burst size of incoming streams, and are typically unaware of any relative importance among the packets of a given traffic stream. Other existing marking mechanisms focus on relative importance among the packets, but cannot control the amount of admitted traffic into the network and hence are unable to enforce an SLA. Notwithstanding, various types of applications requested by customers inherently employ packet-level priority and produce traffic streams in which different types or classes of packets have different levels of priority in order to achieve a desired level of quality of service. One example is video traffic. MPEG-2 video, for example, employs three classes of packets: I-packets, P-packets, and B-packets. More video frames depend upon an I-packet than upon a P-packet, and more video frames depend upon a P-packet than upon a B-packet.

Inherent to this order of dependency is an order of priority. In general, losing a high-priority packet has a greater adverse effect on quality than losing a low-priority packet. As a result, discarding an I-packet during congestion, for example, causes greater quality degradation than discarding a P-packet, and discarding a P-packet causes greater quality degradation than discarding a B-packet.

Other types of applications may similarly employ priority among packets. For voice traffic, as an example, dropping a packet during a silent interval between words is better than dropping a packet during a spoken word. As another example, in a virtual private network (VPN), a traffic stream corresponding to a business transaction may be considerably more important than a traffic stream associated with browsing the Internet.

Existing marking mechanisms that enforce an SLA, however, do not consider the "priority" or importance of individual packets, but mark packets based on the traffic profile only. Thus, despite varying levels of importance, all types of packets of a particular application can conceivably be out-of-profile, receive the same drop-precedence characteristics, and consequently be discarded irrespective of their importance. Other existing marking mechanisms may mark packets based on their importance only, but in this case have no control on the amount of admitted traffic into the network. When there is network congestion, too many packets from an application can be dropped, which can violate an SLA even though the dropped packets are low-priority. Therefore, there is a need for a marking mechanism that can maintain, on average, conformance to a traffic profile, but that can also be sufficiently flexible to enable delivery of high-priority packets even during out-of-profile traffic conditions.

SUMMARY

In one aspect, the invention features a method, in a communications network, of marking a packet of a multi-priority stream to establish a drop precedence of the packet. The method comprises: receiving a first packet and a second packet of the multi-priority stream, the first packet having a higher priority than the second packet; determining that the first packet is non-conforming with respect to a traffic profile and that the second packet is conforming with respect to the traffic profile; and associating the non-conforming, higher priority first packet with lower drop precedence and associating the conforming second packet with higher drop precedence.

In another aspect, the invention features a a non-transitory processor-readable medium storing instructions executable in a communications network to mark a packet of a multi-priority stream to establish a drop precedence of the packet. The instructions comprise instructions executable: to receive a first packet and a second packet of the multi-priority stream, the first packet having a higher priority than the second packet; to determine that the first packet is non-conforming with respect to a traffic profile and that the second packet is conforming with respect to the traffic profile; and to associate the non-conforming, higher priority first packet with lower drop precedence and to associate the conforming second packet with higher drop precedence.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 10A and FIG. 10B are block diagrams illustrating an exemplary situation in which a high drop-precedence marking of an I-packet is exchanged with a low drop-precedence marking of a B-packet, as the I-packet enters the color-exchange queue.

FIG. 10C and FIG. 10D are block diagrams illustrating an exemplary situation in which a high drop-precedence marking of an I-packet is exchanged with a low drop-precedence marking of a B-packet, as the I-packet leaves the color-exchange queue.

DETAILED DESCRIPTION

Figure 1:
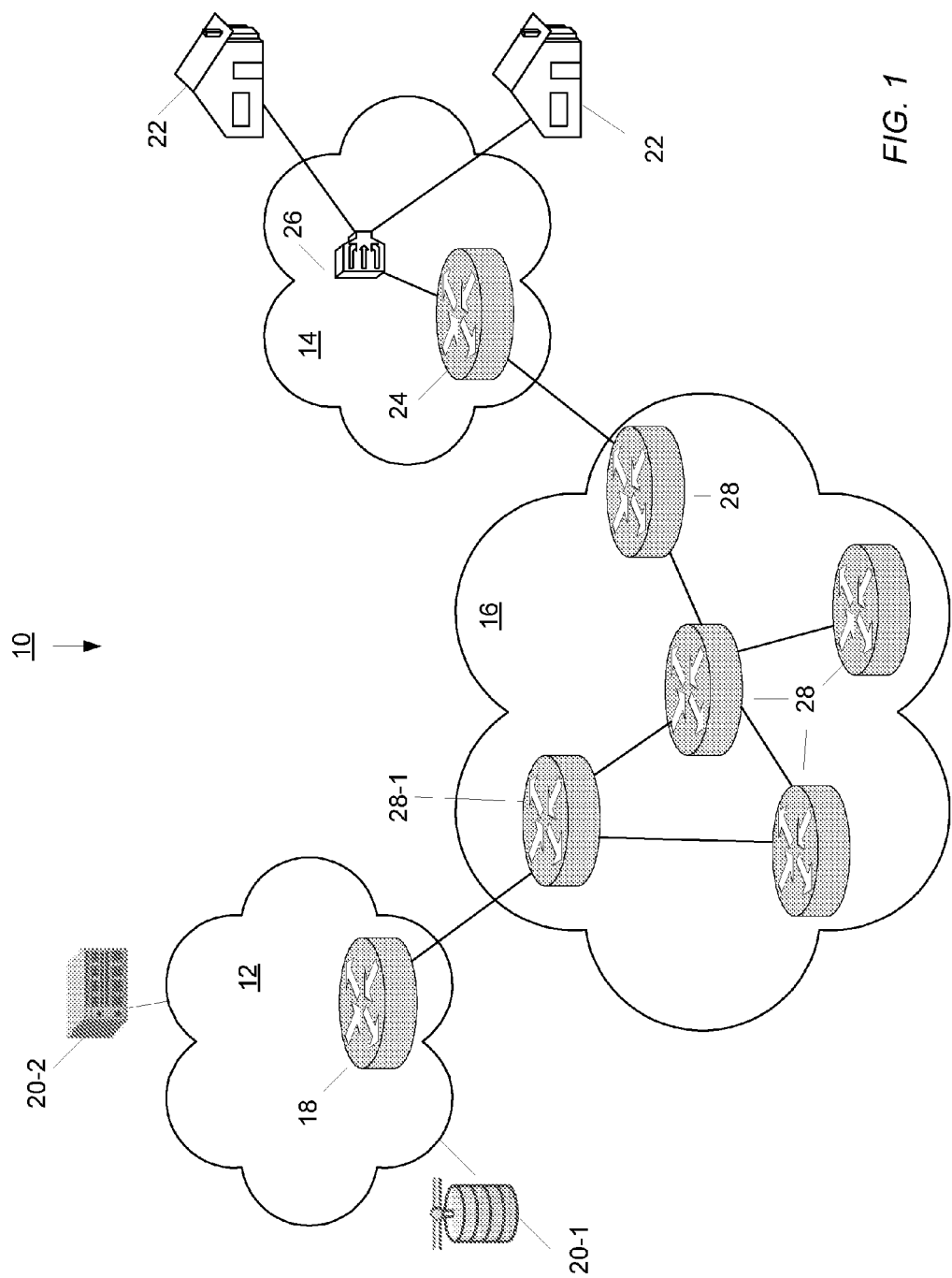
FIG. 1 is a block diagram of an exemplary networking environment in which aspects of the invention may be implemented.

The present invention features various elastic-marking mechanisms for marking packets of a multi-priority stream so that the stream, on average, conforms to the traffic profile imposed by a service level agreement (SLA) while higher priority packets of the stream receive a better marker (i.e., lower drop precedence) than lower priority packets. The elastic-marking mechanism can improve the quality of a service (e.g., video) by producing traffic marking that takes into account the multiple priorities in a traffic stream and that gives high-priority packets, although out-of-profile, a lower drop-precedence than in-profile, low-priority packets during a network congestion condition.

A first type of elastic-marking mechanism supplements a token bucket with one or more "loan buckets." In brief overview, an out-of-profile, high-priority packet, in effect, borrows bandwidth from a low-priority packet. Instead of being marked with high drop-precedence, the out-of-profile, high-priority packet is marked as in-profile with low drop-precedence. A loan bucket "records" the borrowed bandwidth. Later, when an in-profile, low-priority packet arrives at the router, the low-priority packet is marked as out-of-profile, in effect, paying for the debt incurred by the earlier high-priority packet. The record of the borrowed bandwidth is removed from the loan bucket to indicate erasure of the debt. This elastic-marking mechanism can increase the burst size of in-profile traffic, while maintaining the same average rate.

A second type of elastic-marking mechanism supplements a token bucket with a "color-exchange" queue. The token bucket marks incoming packets and forwards the marked packets to the color-exchange queue. The color-exchange queue holds each packet for a fixed period, thus, imposing a constant delay between the marking and forwarding of the packets. These delayed queued packets provide a pool of candidates with which a color-exchange may be made. For example, if an out-of-profile, high-priority packet enters or is about to exit the queue, and a low-priority in-profile packet is already in the queue, then the marking of the high-priority packet is swapped with the marking of the low-priority packet. Like the token-bucket-with-loan-bucket mechanism, in the long term the token-bucket-with-color-exchange mechanism does not change the amount of total in-profile traffic admitted to the network, although it can increase the instantaneous amount of traffic.

The elastic-marking mechanisms are applicable to any type of traffic stream with different levels of packet priority (i.e., multi-priority). Video traffic is one example of a multi-priority stream. Although described herein primarily with respect to video traffic (e.g., MPEG-2 video), the principles of the invention extend also to other types of applications (e.g., voice traffic). In addition, although throughout the description reference is made to "marking" mechanisms, systems, methods, and processes, it is to be understood that the term "marking" within these contexts is intended to encompass more than just the operation of changing a field within a packet header, but also the operation of policing packet traffic, i.e., taking or causing an action (e.g., dropping), based on the field. Further, marking may not be explicit, that is, a router can perform an action, such as drop, based on the result of a marking determination, without actually changing the packet field. For example, an edge router operating in a two-color mode can allow green traffic only and drop all other traffic and, consequently, does not need to modify any packet fields.

FIG. 1 shows an example of a networking environment 10 in which the invention may be implemented. The networking environment 10 includes a service provider network 12 in communication with an access network 14 by way of a core network 16. The service provider network 12 includes routers (or switches) 18 for routing content associated with one or more applications 20-1, 20-2 (e.g., video-on-demand) to the core network 16 for delivery to customers 22 connected to the access network 14. The access network 14 can include routers 24 for routing packets to and from the core network 16 and, for example, a DSLAM (Digital Subscriber Line Access Multiplexer) device 26 to give customers 22 access to the network environment 10.

Service level agreements (SLA) between the customers 22 and service providers specify the bounds for the traffic generated in support of an application 20, and SLAs between service providers and the core network specify the bounds for the traffic generated in support of many applications and to be admitted into the core network. The SLAs between service providers and the core network specify the bounds for aggregate traffic for many individual customers serviced by the given service provider. The bounds, typically expressed in terms of parameters, define a traffic profile. Packet traffic conforming to the traffic profile is in-profile, whereas non-conforming packet traffic is out-of-profile.

The core network 16 includes a plurality of routers 28 (and/or switches) for forwarding packet traffic between applications 20 and customers 22. Some or all of the core routers 28 perform differentiated services techniques, such as the Internet Engineering Task Force (IETF) standard DiffServ.

At least one of the routers 28—designated in FIG. 1 by reference numeral 28-1—is an edge router that enforces the SLA. The edge router 28-1 meters and marks packet traffic arriving from the service provider network 12 to ensure that the traffic conforms to the traffic profile specified in the SLA. The marking of packets occurs in accordance with one of the elastic-marking mechanisms of the invention, as described in more detail below. The routers 28 in the core network 16 use the result of the marking to determine which packets to drop during congestion, with a greater incidence of dropping occurring to those packets marked with high drop precedence than to those of low drop precedence.

As described herein, color markers of green, yellow, and red are associated with different levels of drop precedence, with traffic marked red having a higher drop-precedence than traffic marked yellow, and with traffic marked yellow having a higher drop-precedence than traffic marked green. Routers 28 may also discard red traffic immediately. As used herein, the phrase "low drop precedence" corresponds to a green color marker and is associated with packet traffic that is to be treated by routers in the network as in-profile. The phrase "high drop precedence" corresponds to either a yellow or red color marker and is associated with packet traffic that is to be treated as out-of-profile.

Figure 2A:
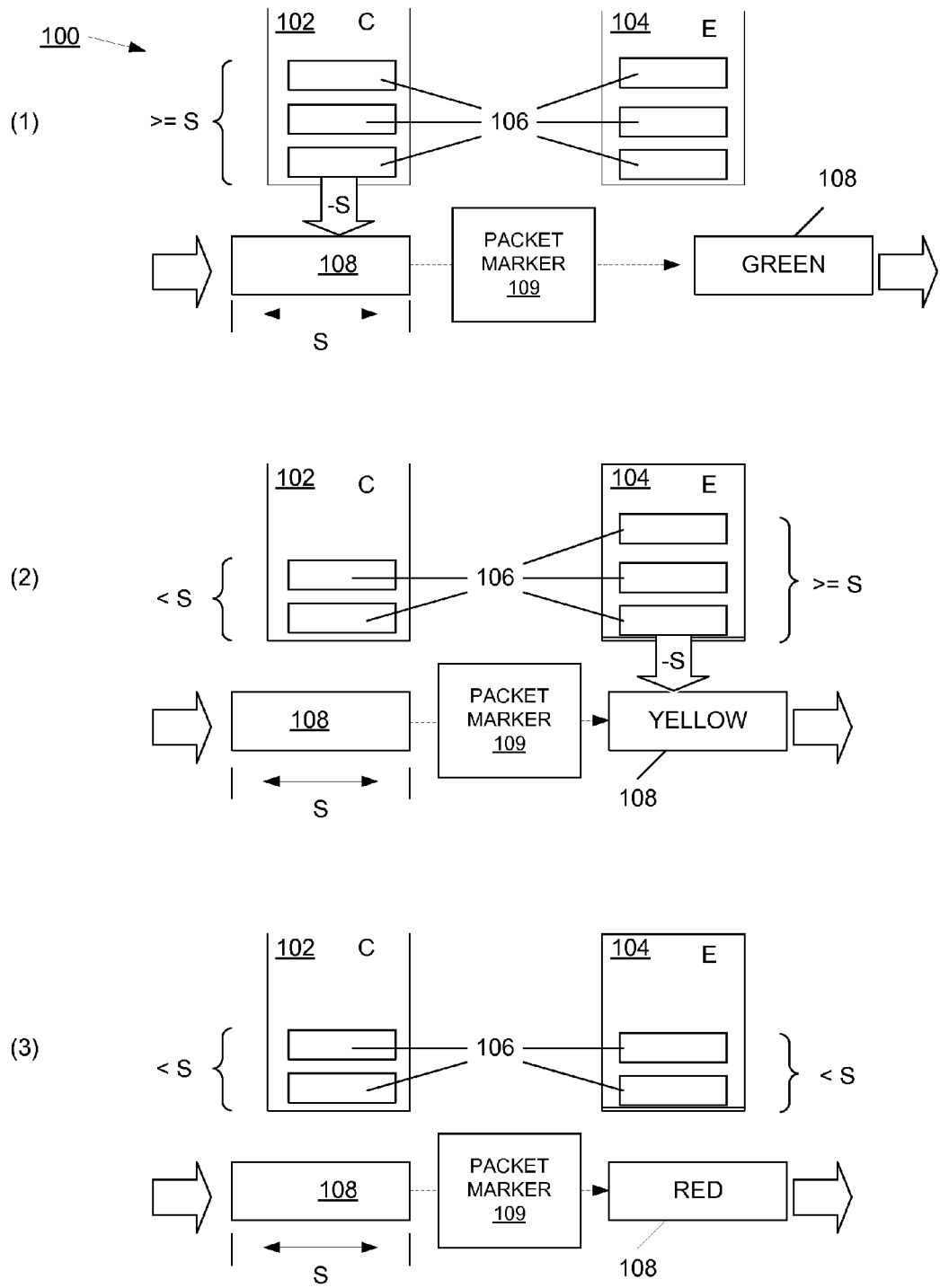
FIG. 2A is a block diagram of an embodiment of a single-rate marker for marking incoming packets based on a committed information rate.
Figure 2B:
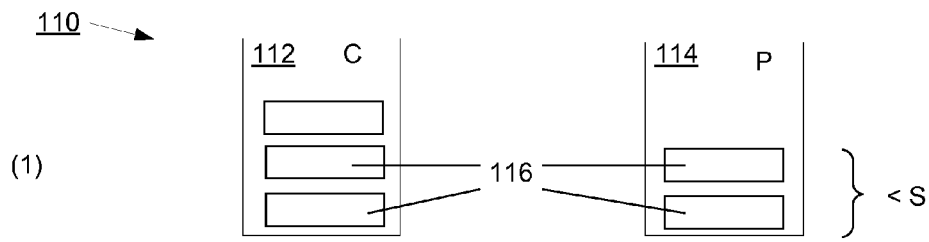
FIG. 2B is a diagram of an embodiment of a two-rate marker for marking packets based on a committed information rate and a peak information rate.
Figure 2B:
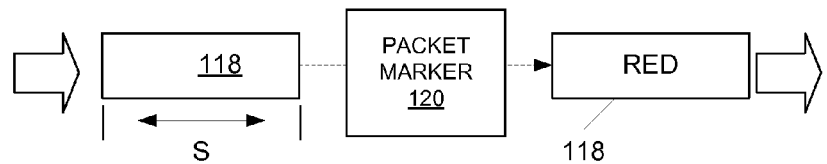
Figure 2B:
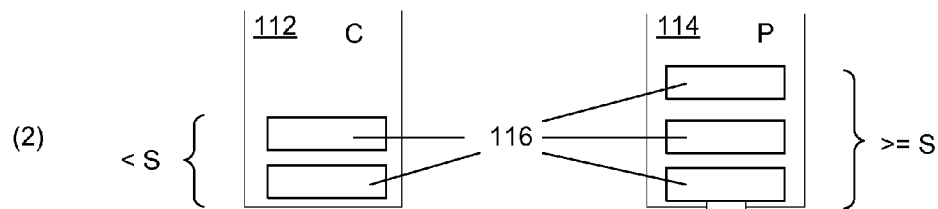
Figure 2B:
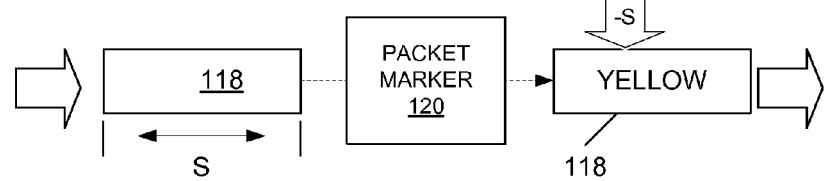
Figure 2B:
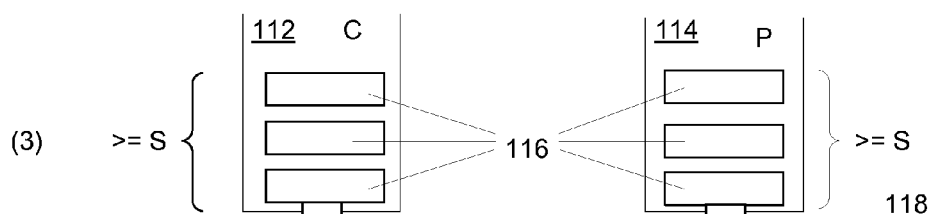
Figure 2B:
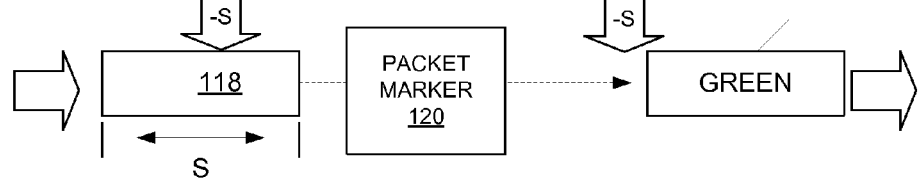

FIG. 2A and FIG. 2B show two types of token-bucket-based marking mechanisms: FIG. 2A illustrates a single-rate marker 100, and FIG. 2B illustrates a two-rate marker 110. Request for Comments (RFC) 2697, dated September 1999 and titled "A Single Rate Three Color Marker," by J. Heinanen et al. describes an example of a single-rate marker, the entirety of which is incorporated by reference herein. A description of a two-rate marker appears in Request for Comments (RFC) 2698, dated September 1999 and titled "A Two Rate Three Color Marker," by J. Heinanen et al., the entirety of which is incorporated by reference herein. Markers can operate either in a "color-aware" mode or in a "color-blind" mode, depending on whether incoming traffic is already marked. For purposes of simplifying a description of the invention, consider that a router implementing these two types of markers (and those markers described below embodying the invention) operates in color-blind mode.

Referring to FIG. 2A, operation of the single-rate marker 100 is based on three parameters: a committed information rate (CIR), a committed burst size (CBS), and an excess burst size (EBS). The single-rate marker 100 includes two token buckets 102, 104 (referred to as token buckets C and E, respectively) with maximum sizes, CBS and EBS, respectively, and a packet-marker 109. Both token buckets C and E are initially full and receive tokens at the CIR rate. Accordingly, the following process occurs CIR times per second: (1) if the number of tokens 106 in token bucket C is less than the committed burst size CBS, then add a token to token bucket C; (2) otherwise, if the number of tokens in token bucket E is less than the committed burst size EBS, then add a token to token bucket E; (3) otherwise, do not increment either token bucket C or E. This process can be expressed with the following pseudo-code:
{/start
if C<CBS, then ++C,
else if E<EBS, then ++E,
else, no increment.
}/end When a packet 108 of size S (e.g., in bytes) arrives, the router marks the packet according to the following process: (1) if the token bucket C has at least S tokens 106, then the packet-marker 109 marks the packet as green and decrements the number of tokens in token bucket C by S; (2) otherwise the token bucket C has fewer than S tokens, and if the token bucket E has at least S tokens 106, then the packet-marker 109 marks the packet as yellow and decrements the number of tokens in token bucket E by S; (3) otherwise each token bucket C and E has fewer than S tokens and the router marks the packet as red without decrementing either token bucket C or token bucket E.

This single-rate marking process can be expressed with the following pseudo-code:
{/start
if C−S>=0, then the packet is green and C is decremented by S,
else if E−S>=0, then the packet is yellow and E is decremented by S,
else, the packet is red and neither C nor E is decremented.
}/end The single-rate marker 100 thus limits green traffic to $(t-t_0)*CIR+CBS$, and a combined green and yellow traffic to $(t-t_0)*CIR+CBS+EBS$, where $t_0$ is an instant when both token buckets C and E are full.

Referring now to FIG. 2B, operation of the two-rate marker 110 is based on four parameters: a committed information rate (CIR), a committed burst size (CBS), a peak information rate (PIR), and a peak burst size (PBS). The two-rate marker includes two token buckets 112, 114, referred to as token buckets C and P, with maximum sizes CBS and PBS, respectively, and a packet-marker 120. Both token buckets C and P are initially full and receive tokens at rates CIR and PIR, respectively, i.e., C is incremented by 1, CIR times per second up to the maximum of CBS, and P is incremented by 1, PIR times per second up to the maximum PBS.

When a packet 118 of size S arrives, the router marks the packet according to the following process: (1) if token bucket P has fewer than S tokens 116, the packet-marker 120 marks the packet as red and does not decrement either token bucket C or token bucket P; (2) otherwise the token bucket P has at least S tokens and if the token bucket C has fewer than S tokens, the packet-marker 120 marks the packet as yellow and decrements token bucket P by S tokens; (3) otherwise each token bucket C and P has at least S tokens, the packet-marker 120 marks the packet as green and decrements both token bucket C and token bucket P by S. This two-rate marking process can be expressed with the following pseudo-code:

{/start
if P−S<0, then the packet is red and neither C nor P is decremented,
else if C−S<0, then the packet is yellow and P is decremented by S,
else, the packet is green and both C and P are decremented by S.
}/end The two-rate marker 110 thus limits green traffic to $(t-t_0)*CIR+CBS$, and combined green and yellow traffic to $(t-t_0)*PIR+PBS$, where $t_0$ is an instant when both token buckets C and P are full.

Figure 3:
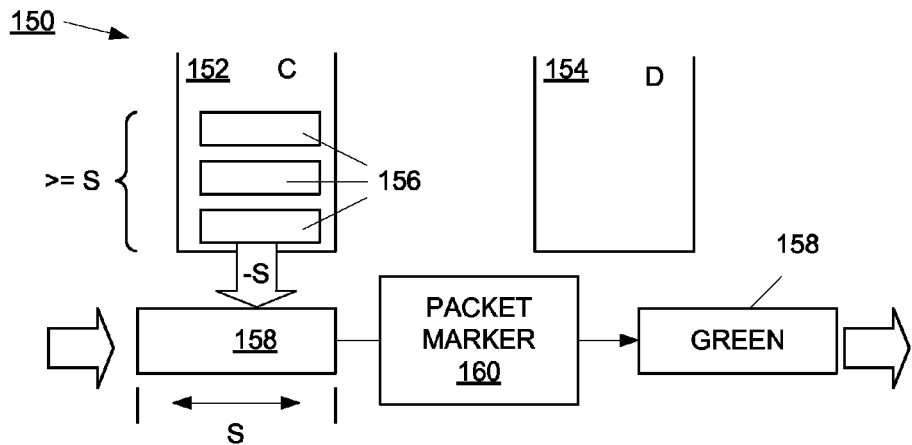
FIG. 3 is a block diagram of an embodiment of a packet-marking system, including a token bucket and a loan bucket, for marking incoming packets in accordance with the invention.

FIG. 3 illustrates an embodiment of a packet-marking system 150 of the present invention, including a token bucket 152 (referred to as token bucket C), a loan bucket 154 (referred to as loan bucket D), and a packet marker 160. In this example, the token bucket C is a two-color token bucket with parameters CIR and CBS. Initially, the token bucket C is full of tokens 156 and regularly receives additional tokens 156 at the CIR rate, without exceeding the maximum CBS. The loan bucket D is initially empty. In this exemplary embodiment, based on the status of the token and loan buckets, the packet marker 160 marks each incoming packet 158 of a multi-priority stream with one of two colors, here, e.g., green and yellow, to establish the drop precedence of that packet. Green corresponds to low drop precedence, yellow, to high drop precedence.

Figure 4:
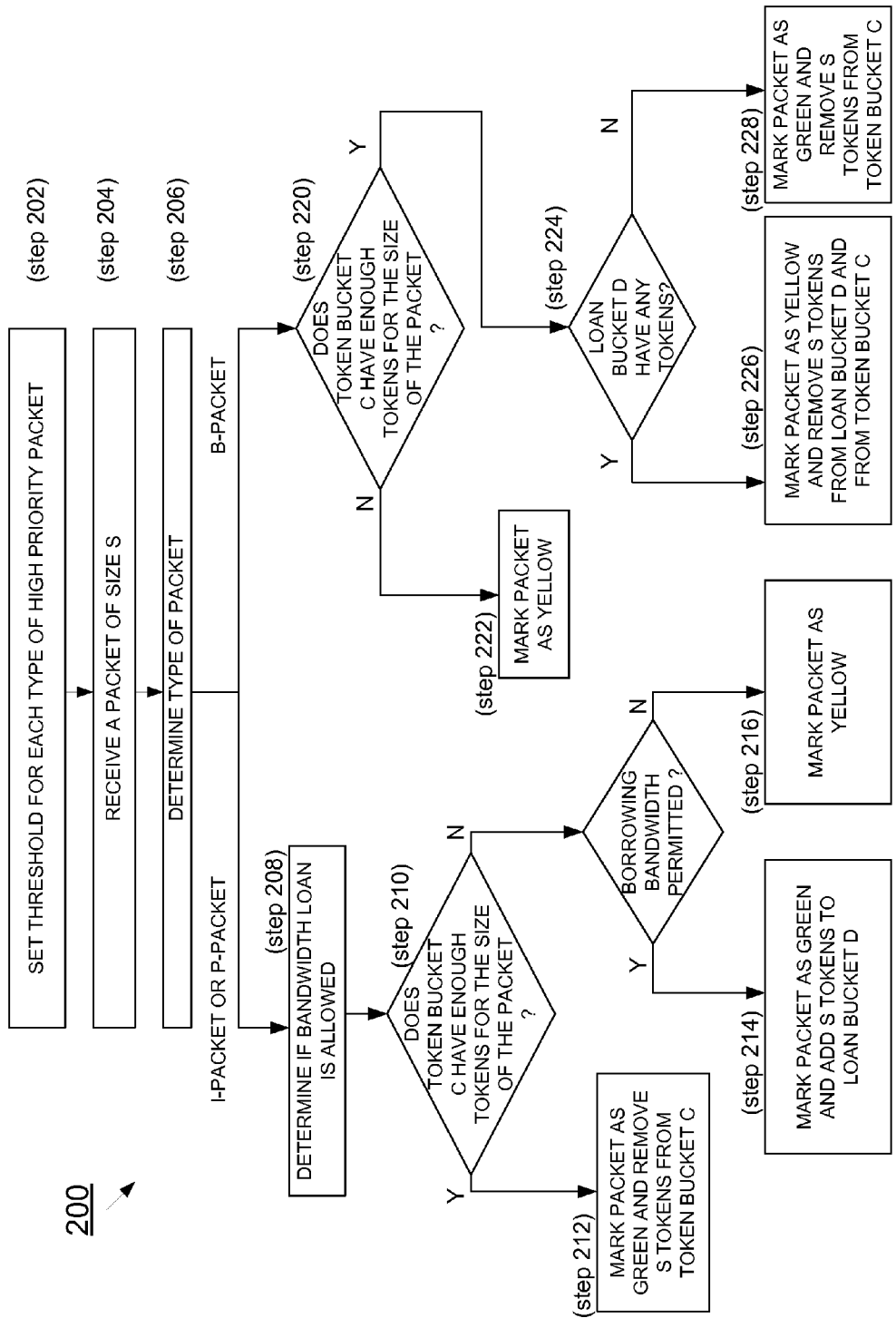
FIG. 4 is a flow diagram of an embodiment of a process for marking incoming packets using the token bucket and loan bucket of FIG. 3.

FIG. 4 shows an embodiment of a process 200 performed by the packet-marking system 150 of FIG. 3 for marking and policing incoming packets 158 of a multi-priority stream in accordance with the invention. The incoming packets 158 have different priority levels. As an example, consider that the incoming packets make up an MPEG-2 video stream comprised of I-packets, P-packets, and B-packets. In this example, I-packets have a higher priority than P-packets, and both I-packets and P-packets have a higher priority than B-packets.

As a general overview of the process 200, a high-priority packet found to be out-of-profile can borrow bandwidth, and instead of marking the high-priority packet with high-drop precedence befitting out-of-profile traffic, the packet-marking system 150 marks the packet with low drop precedence generally associated with in-profile traffic. A subsequently arriving low-priority packet—one determined to be in-profile—"pays the debt" incurred by the high-priority packet by being marked as out-of-profile. In effect, the high-priority packet has thus borrowed bandwidth from this low-priority packet. Applying this principle of operation to the MPEG-2 video stream described above, in one embodiment the high-priority I-packets and P-packets borrow bandwidth from low-priority B-packets, in accordance with the invention. In another embodiment, I-packets borrow from P-packets, in addition to borrowing from B-packets.

Describing the process 200 more specifically, at step 202, a threshold $T_i$ is set for I-packets and another threshold $T_p$ for P-packets. Each threshold establishes a maximum limit to the total "debt" that may be incurred in order to allow an out-of-profile high priority packet to receive low drop precedence. The packet-marking system 150 borrows bandwidth for I-packets for as long as the total debt is less than $T_i$, and for P-packets for as long as the total debt is less than $T_p$. As the total debt, it becomes increasingly difficult to borrow additional bandwidth for each type of packet. In one embodiment, the threshold $T_i$ is greater than the threshold $T_p$. Accordingly, I-packets have greater opportunity to borrow bandwidth than P-packets because the packet-marking system 150 permits a greater total debt in order to enable I-packets to receive low drop precedence. In another embodiment, the thresholds $T_i$, $T_p$ are equal to each other. In still another embodiment, the threshold $T_p$ is greater than the threshold $T_i$.

At step 204, a packet of size S arrives at a router. The router determines (step 206) the type of packet. If the type of packet is either an I-packet or a P-packet, the number of tokens in the loan bucket D is compared to the appropriate threshold, $T_i$ for I-packets and $T_p$ for P-packets, to determine (step 208) whether borrowing bandwidth is permitted for that type of packet. If the number of tokens in the loan bucket D is less than the relevant threshold, then borrowing bandwidth is allowed, otherwise, borrowing is disallowed.

Whether borrowing bandwidth is allowed or disallowed, the token bucket C is examined to determine (step 210) if there are sufficient tokens for the packet of size S. If there is a sufficient number, at step 212, the packet is marked green (i.e., the packet traffic is in-profile) and S tokens are removed from the token bucket C. This result is diagrammatically illustrated in FIG. 3.

Figure 5A:
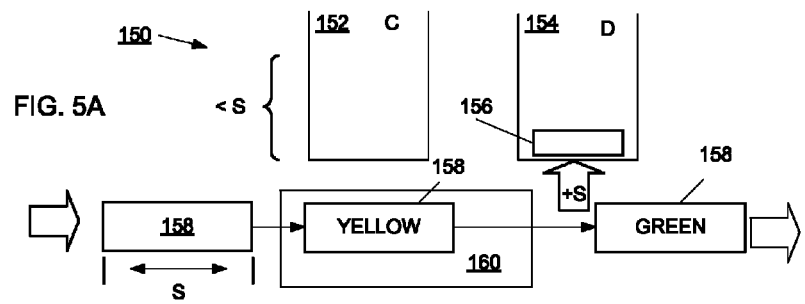
FIG. 5A is a block diagram illustrating, by example, a process by which an out-of-profile high-priority packet borrows bandwidth to become an in-profile packet.

If instead, the token bucket C does not have S tokens—and borrowing is allowed—at step 214, the packet is marked green and S tokens are added to the loan bucket D. Adding tokens to the loan bucket D, in effect, records the amount of incurred debt. As a result, a high-priority packet, which would have been marked with high drop precedence because it is out-of-profile, instead receives low drop precedence. FIG. 5A diagrammatically illustrates this change in status from an out-of-profile packet with a yellow marker to an in-profile packet with a green marker, thus signifying the borrowing of bandwidth by the high-priority packet. Although FIG. 5A shows the marking of the packet changing from yellow to green, it is to be understood that there does not need to be any intermediate step of marking the packet yellow.

Figure 5B:
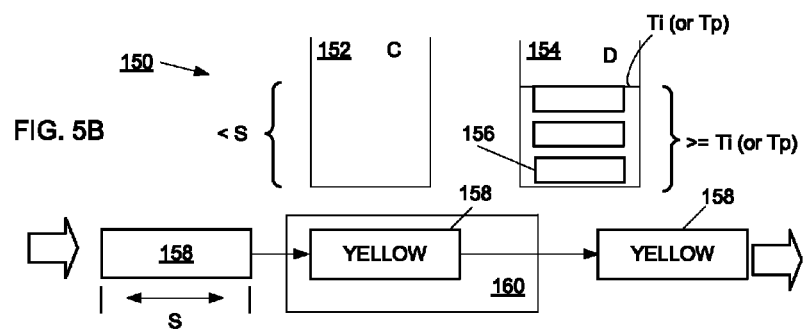
FIG. 5B is a block diagram illustrating, by example, a process by which an out-of-profile high-priority packet receives a high-drop precedence marking and remains out-of-profile when a bandwidth borrowing limit has been reached.

If instead, borrowing is not permitted because the loan bucket D is "full", as determined by the relevant threshold $T_i$ or $T_p$, the high-priority packet is marked (step 216) as yellow (i.e., out-of-profile) and is forwarded through the network with this high drop precedence. FIG. 5B diagrammatically illustrates the situation where an out-of-profile I-packet receives a high drop precedence marking and remains out-of-profile because the borrowing limit, $T_i$, has been reached.

Figure 5C:
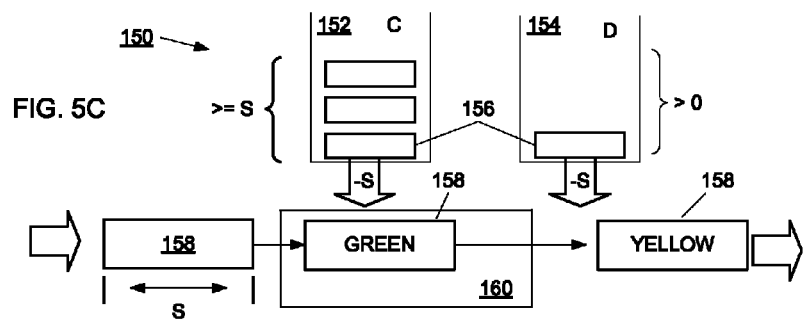
FIG. 5C is a block diagram illustrating, by example, a process by which a subsequently arriving, in-profile, low-priority packet pays for a bandwidth debt incurred by high-priority packet.

If, at step 206, it is determined that the incoming packet is a B-packet, the token bucket C is examined to determine (step 220) whether the token bucket C contains at least S tokens. If not, the packet is marked yellow (step 222) because it is out-of-profile. However, if there are enough tokens in the token bucket C, i.e., the packet is in-profile, the loan bucket D is examined to determine (step 224) whether the loan bucket D contains any tokens. If there is at least one token in the loan bucket D, then at step 226, the packet is marked yellow and S tokens are removed from the token bucket C and from the loan bucket D. FIG. 5C diagrammatically illustrates this change in status from an in-profile low-priority packet with a green marking to an out-of-profile packet with a yellow marking, thus signifying the paying for a bandwidth debt previously incurred by an I-packet or by a P-packet. Removing tokens from the loan bucket D represents erasure of this previously incurred debt.

If, instead, the token bucket C has at least S tokens and the loan bucket D is empty, then the packet is marked green and S tokens are removed from the token bucket C at step 228.

This two-color marking process 200 can be expressed with the following pseudo-code:

{/start
for I- and P-packets{
if 0<=D<T, ($T_p$ for P-packets) then loan is allowed;
if C−S>=0, then the packet is green and C is decremented by S;
else, the packet is still green and D is incremented by S.
if $T_i$ ($T_p$ for P packets)<=D then loan is not allowed;
if C−S>=0, then the packet is green and C is decremented by S,
else, the packet is yellow.
}/For I- and P-packets
for B-packets{
if C−S<0, then the packet is yellow,
else if D>0, then the packet is yellow and both D and C are decremented by S;
else, the packet is green and C is decremented by S.
}/for B-packets
}/end This marker limits the green traffic to $(t-t_0)$*CIR+CBS+T, (+max packet size). This value is an upper limit. The green traffic admitted to the network will not exceed $(t-t_0)$*CIR+CBS over a long period.

Three-Color Marking Mechanism

Figure 6:
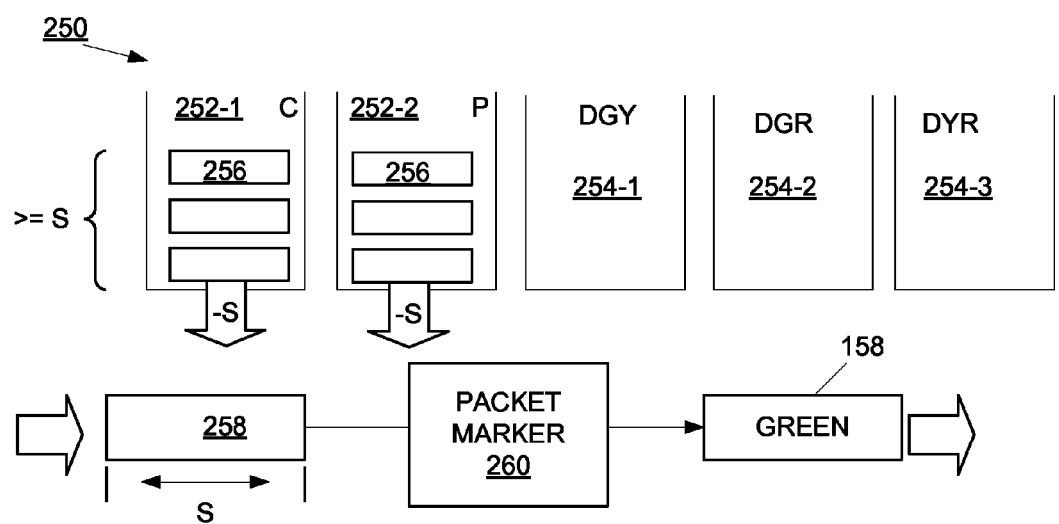
FIG. 6 is a block diagram of another embodiment of a packet-marking system, including a pair of token buckets and a plurality of loan buckets, for marking incoming packets in accordance with the invention.

FIG. 6 shows another embodiment of a packet-marking system 250 of the present invention, including a pair of token buckets 252-1, 252-2 (referred to as token buckets C and P, respectively), a plurality of loan buckets 254-1, 254-2, 254-3 (referred to generally as loan bucket 254 and individually as loan buckets $D_{GY}$, $D_{GR}$, and $D_{YR}$), and a packet marker 260. The subscript labeling of each loan bucket 254 identifies the borrowing color and the borrowed color. For example, the loan bucket $D_{GY}$ corresponds to green borrowing bandwidth from yellow.

Token bucket C operates according to parameters CIR and CBS, and token bucket P operates according to parameters PIR and PBS. Updates to the token buckets C and P occur regularly at respective rates CIR and PIR, up to a respective maximum of CBS and PBS. Initially, the two token buckets, C and P, are full of tokens, and the three loan buckets, $D_{GY}$, $D_{GR}$, and $D_{YR}$, are empty. Each loan bucket $D_{XX}$ is associated with two thresholds, $T_{XXI}$ and $T_{XXP}$, with $T_{XXP}$<=$T_{XXI}$. For example, $D_{GY}$ has two thresholds, $T_{GYI}$ and $T_{GYP}$. The token bucket parameters and loan bucket thresholds can be set according to the desired amount of flexibility for each priority level, and according to the traffic profile. The permitted amount of instantaneous increase in high-priority traffic is adjustable, by modifying the thresholds of the loan buckets.

Figure 7A:
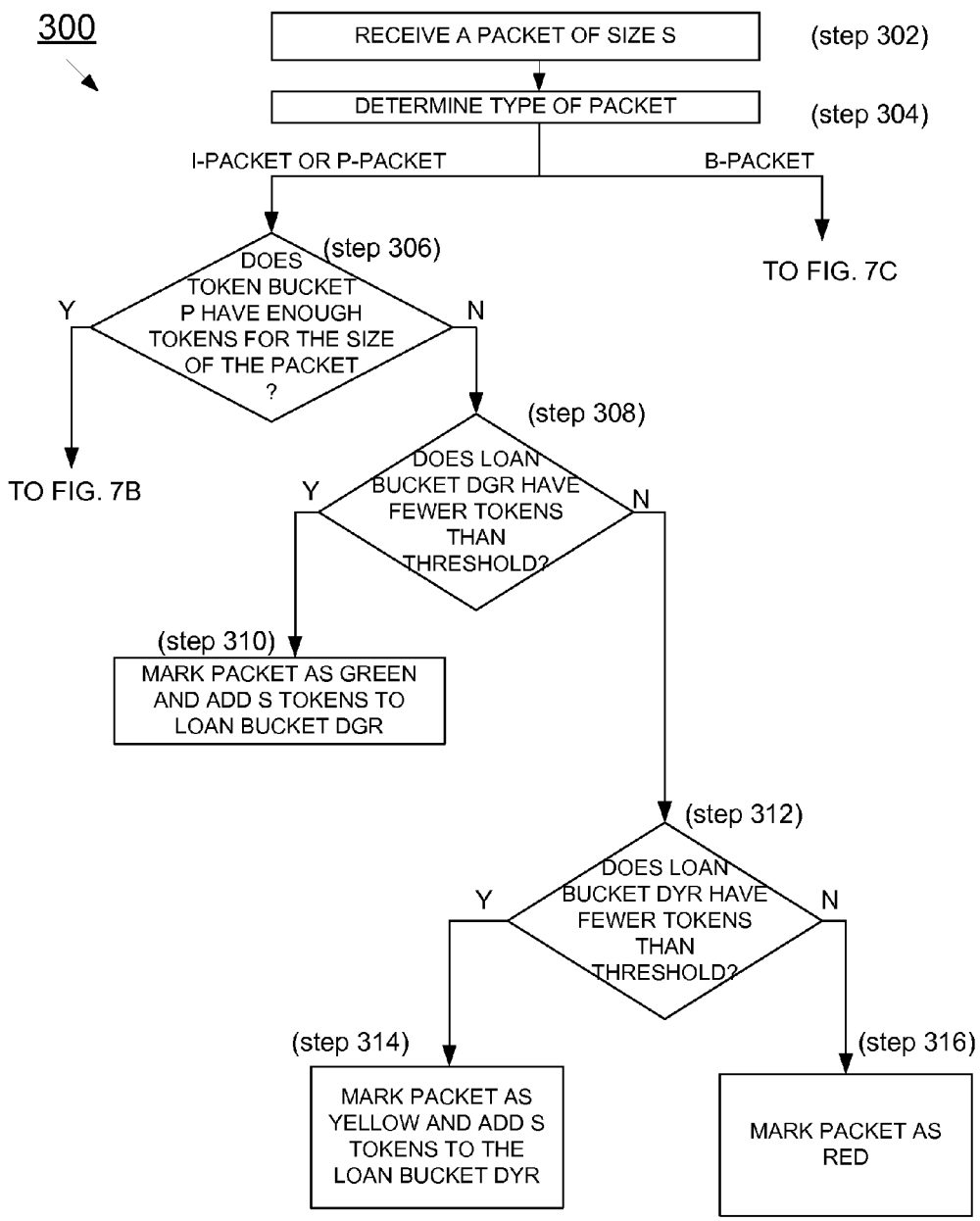
FIGS. 7A-7C are a flow diagram of an embodiment of a process performed by the packet-marking system of FIG. 6 for marking incoming packets of a multi-priority stream in accordance with the invention.
Figure 7B:
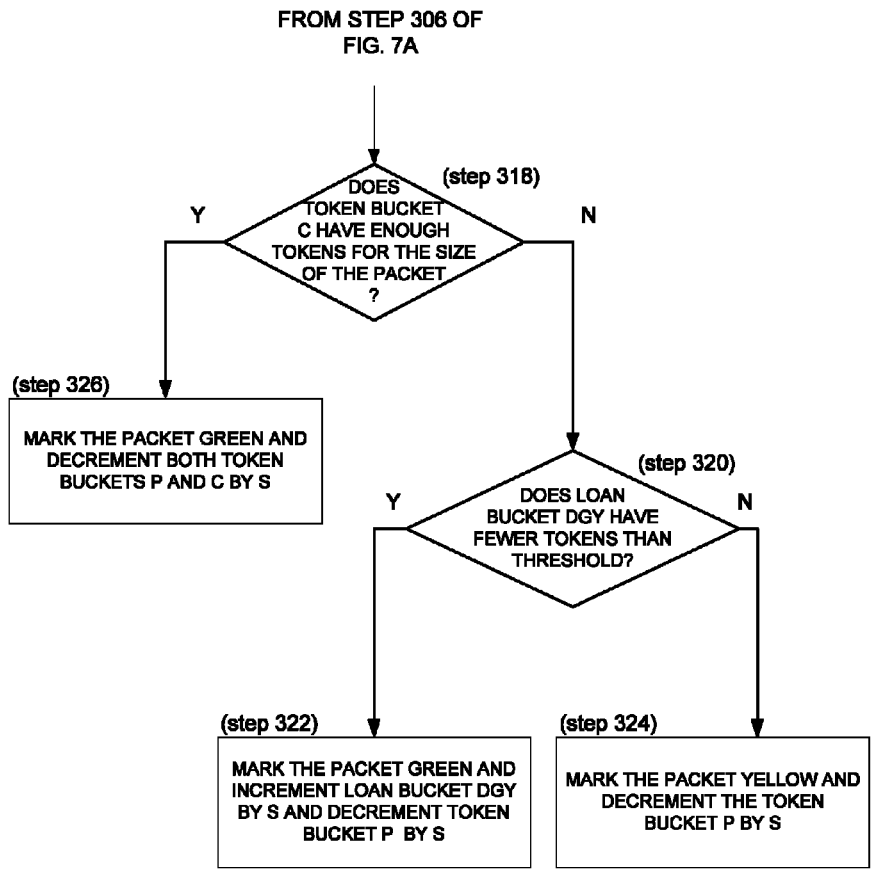
Figure 7C:
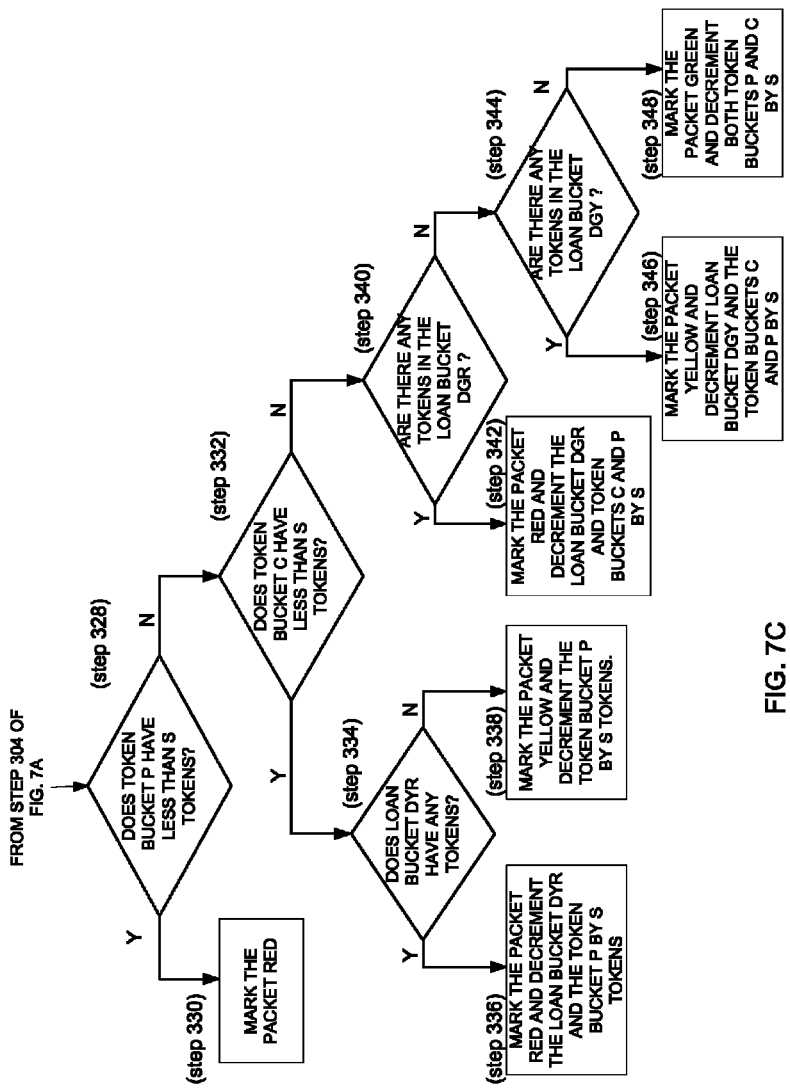

FIGS. 7A-7C together show an embodiment of a process 300 performed by the packet-marking system 250 of FIG. 6 for marking and policing incoming packets 258 of a multi-priority stream in accordance with the invention. Consider again, for example, that the incoming packets 258 make up a video stream comprised of I-packets, P-packets, and B-packets with three different levels of priority as described above.

As a general overview of the process 300, based on the status of the token buckets and loan buckets, the packet marker 260 marks each incoming packet 258 of a multi-priority stream with one of three colors, here, e.g., green, yellow, or red, to establish the drop precedence of that packet. Like the two-color marking mechanism described above in FIG. 3, a high-priority packet found to be out-of-profile can borrow bandwidth from a subsequently arriving in-profile low-priority packet. Instead of marking a high-priority packet as out-of-profile, with attendant high drop precedence, the packet-marking system 250 marks the packet as in-profile with low drop precedence. A subsequently arriving in-profile low-priority packet pays the debt incurred by the high-priority packet by being marked as out-of-profile. The three-color marking mechanism enables bandwidth to be borrowed for different color combinations, that is, green can borrow from yellow, green can borrow from red, and yellow can borrow from red.

Describing the process 300 more specifically, at step 302, a packet of size S arrives at a router, which determines the type of packet at step 304. If the type of packet is an I-packet, it is determined (step 306) whether the token bucket P has at least S tokens. Previously, as illustrated in FIG. 2B, an incoming packet that finds the token bucket P with fewer than S tokens would have been marked red. Instead, in accordance with the invention, if token bucket P has fewer than S tokens, the loan bucket $D_{GR}$ is examined (step 308) to determine if the loan bucket $D_{GR}$ contains fewer tokens than the threshold $T_{GR}$. If so, the packet is marked green (step 310) and S tokens are added to the loan bucket $D_{GR}$. In this instance, a would-be red packet has instead become green: i.e., green has borrowed from red.

If instead, the number of tokens in the loan bucket $D_{GR}$ has reached the threshold, $T_{GRI}$, a loan from the loan bucket $D_{GR}$ is not allowed. Accordingly, it is then determined (step 312) whether a loan is allowed from the loan bucket $D_{YR}$ (i.e., whether the loan bucket $D_{YR}$ has fewer tokens than the threshold $T_{YRI}$). If a loan from the loan bucket $D_{YR}$ is allowed, then at step 314, the packet is marked yellow and S tokens are added to the loan bucket $D_{YR}$. However, if a loan from the loan bucket $D_{YR}$ is not allowed, at step 316, the packet is marked red.

Referring now to FIG. 7B, if it is instead determined that the token bucket P does have at least S tokens, then, at step 318, the token bucket C is examined to determine if the token bucket C has at least S tokens. If the token bucket C has fewer than S tokens, it is then determined at step 320 whether the loan bucket $D_{GY}$ has fewer tokens than the threshold $T_{GYI}$. If the number of tokens in the loan bucket $D_{GY}$ is less than the threshold, at step 322 the packet is marked green, the loan bucket $D_{GY}$ is incremented by S (i.e., to "record" the loan), and the token bucket P is decremented by S—previously, as described in FIG. 2B, such a packet would have been marked yellow.

If instead, a loan from the loan bucket $D_{GY}$ is not allowed because the bandwidth debt has reached the relevant threshold, $T_{CYP}$, at step 324 the packet is marked yellow and S tokens are removed from the token bucket P. If, like token bucket P, token bucket C has at least S tokens, then at step 326, the packet is marked green and S tokens are removed from the token bucket C and from the token bucket P.

If at step 304 the type of packet is determined to be a P-packet, then steps 306 through 326 apply also to the marking of the P-packet, except that thresholds $T_{GRP}$, $T_{YRP}$, and $T_{GYP}$ are used instead of the thresholds $T_{GRI}$, $T_{YRI}$, and $T_{GYI}$, respectively.

Referring now to FIG. 7C, if the type of packet is a B-packet, at step 328 the token bucket P is examined to determine whether the token bucket P has fewer than S tokens. If the token bucket P has fewer than S tokens, at step 330, the packet is marked red. If the token bucket P has at least S tokens, then at step 332 it is determined whether the token bucket C has fewer than S tokens. Normally, if the token bucket C has less than S tokens (when token P has at least S tokens), the packet would be marked yellow, as described in FIG. 2B. Here, instead, the process 300 continues at step 334 by determining if the loan bucket $D_{YR}$ is empty.

If the loan bucket $D_{YR}$ is not empty, then at step 336 the packet is marked red, and both the token bucket P and loan bucket $D_{YR}$ are decremented by S. In effect, the B-packet pays for the bandwidth debt of a previous I- or P-packet that had been marked yellow because of borrowed bandwidth, but would have been marked red if not for the borrowing. If the loan bucket $D_{YR}$ is empty, then at step 338 the B-packet is marked yellow, and the token bucket P is decremented by S tokens.

If both token buckets C and P each have at least S tokens, normally the B-packet would be marked green, as described in FIG. 2B. Here instead, the process 300 continues at step 340 by determining whether the loan bucket $D_{GR}$ is empty. If the loan bucket $D_{GR}$ is not empty, then at step 342 the B-packet is marked red, and S tokens are removed from each of the loan bucket $D_{GR}$, token bucket C, and token bucket P. Thus, the B-packet pays for the bandwidth debt of a previous I- or P-packet that had been marked green because of borrowed bandwidth, but would have been marked red if not for the borrowing.

If the loan bucket $D_{GR}$ is empty, then at step 344 it is determined whether the loan bucket $D_{GY}$ has any tokens. If the loan bucket $D_{GY}$ has at least one token, then at step 346 the packet is marked yellow and S tokens are removed from the loan bucket $D_{GY}$, from the token bucket C, and from the token bucket P. Thus, the B-packet pays back a bandwidth debt for a previous I-packet or P-packet that had been marked green because of borrowed bandwidth, but would have been marked yellow if not for the borrowing.

If both loan buckets $D_{GR}$ and $D_{GY}$ are empty, then at step 348 the B-packet is marked green and both the token bucket C and token bucket P are decremented by S.

The three-color marking process 300 can be expressed with the following pseudo-code:

```
{/start
for I-packets{
if S>P then /normally I-packet would be red
{
if D_GR<T_GRI, then the packet is green and D_GR is incremented by S,
else if D_YR<T_YRI, then the packet is yellow and D_YR is incremented by S,
else, the packet is red.
}
else if S>C then /normally I-packet would be yellow
{
if D_GY<T_GYI, then the packet is green, D_GY is incremented by S and P is decremented by S,
else, the packet is yellow and P is decremented by S.
}
else the packet is green and both P and C are decremented by S.
}/for I-packets
for P-packets{
if S>P then /normally the P-packet would be red
{
if D_GR<T_GRP, then the packet is green and D_GR is incremented by S,
else if D_YR<T_YRP, then the packet is yellow and D_YR is incremented by S, else, the packet is red.
}
else if S>C then /normally it would be yellow
{
if D_GY<T_GYP, then the packet is green, D_GY is incremented by S and P is decremented by S,
else, the packet is yellow and P is decremented by S.
}
else the packet is green and both P and C are decremented by S.
}/for P-packets
for B packets{
if S>P then the packet is red.
else if S>C then /normally it would be yellow
{
if D_YR>0, then the packet is red and both P and D_YR are decremented by S/pays debt for a previous red,
else, the packet is yellow and P is decremented by S.
}
else /normally it would be green
{
if D_GR>0, then the packet is red and D_GR, P, and C are decremented by S /pays debt for a previous red,
else if D_GY>0, then the packet is yellow and D_GY, P, and C are decremented by S /pays debt for a previous yellow,
else, the packet is green and both P and C are decremented by S.
}
}/for B-packets
}/end
```

This marking mechanism limits the green traffic to $(t-t_0)*CIR+CBS+T_{GYI}+T_{GRI}$ (+2*maximum packet size). This is an upper limit and the admitted green traffic does not exceed $(t-t_0)*CIR+CBS$ over a long period. Similarly, the combination of green and yellow traffic is limited to $(t-t_0)*PIR+PBS+T_{YRI}+T_{GRI}$ (+2*maximum packet size).

Token Bucket with Color Exchange Queue

Figure 8:
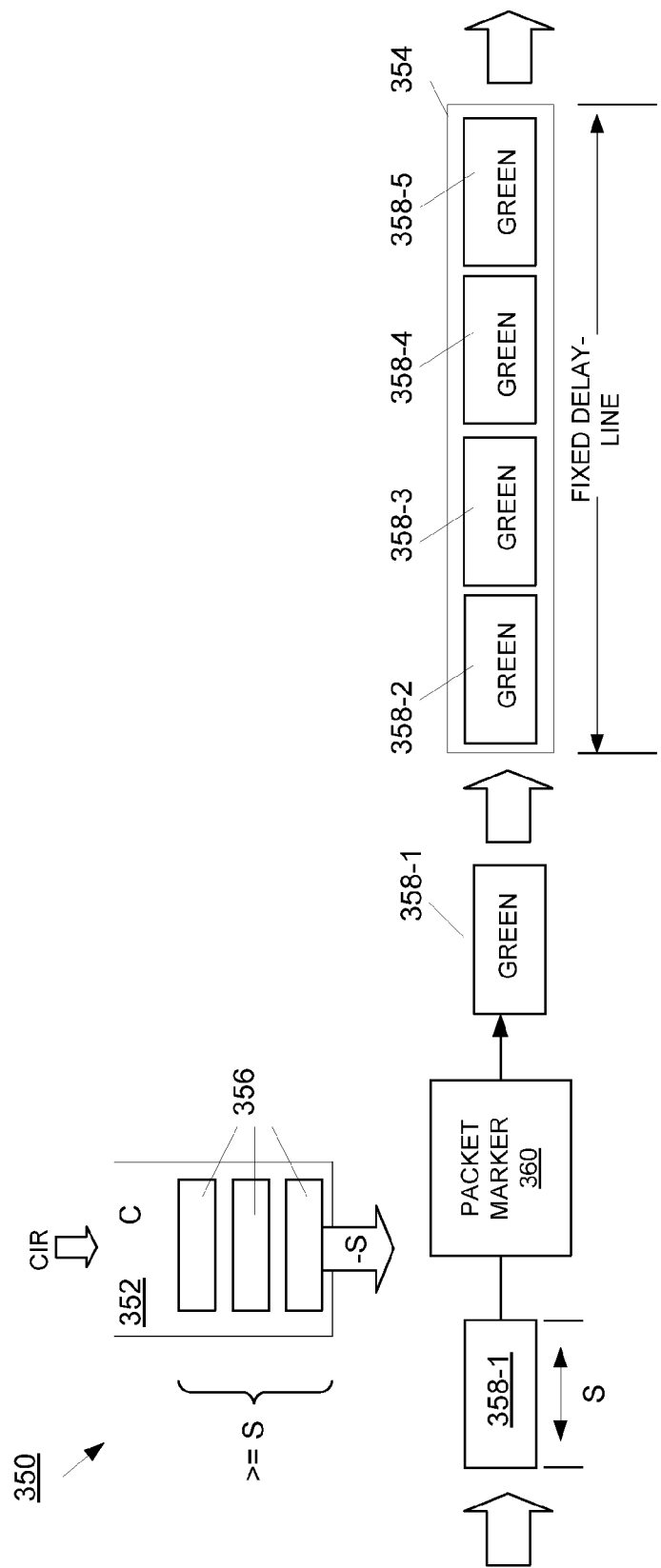
FIG. 8 is a block diagram of another embodiment of a packet-marking system, a token bucket in communication with a color-exchange queue, for marking incoming packets in accordance with the invention.

FIG. 8 illustrates another embodiment of a packet-marking system 350 of the present invention, including a token bucket 352 (referred to as token bucket C), a color-exchange queue 354, and a packet marker 360. The token bucket 352 receives tokens 356 at a rate CIR. The packet marker 360 assigns an initial marking to each incoming packet 358 according to the process described in FIG. 2A. (In another embodiment, the packet-marking system can initially mark incoming packets in accordance with a two-rate marker as described in FIG. 2B.)

Packets marked by the packet marker 360 are not immediately forwarded over the network; rather, the packets pass to the color-exchange queue 354 where the packets experience a fixed delay. The color-exchange queue 354 operates in a first-in first-out (FIFO) fashion. Packets enter the queue 354 at the tail and leave the queue 354 from the head for forwarding over the network. In one embodiment of the queue, the desired constant delay is added to the current time when a packet enters the queue, and the sum is stored together with the packet. This sum is the service time for the packet. For each packet that is at the head of the queue, the service time is read and the packet is forwarded at that time. This ensures that every packet waits for a constant time in the queue, independent of the packet arrival pattern. Although the packet-marking process is described herein with reference to the queue 354, it is to be understood that the queue is an illustrative example of a memory buffer—other types of data structures can be used to practice the invention, provided each packet remains in the data structure for the predetermined constant delay before being forwarded to the network.

In FIG. 8, the packet-marking system 350 is shown operating while the token bucket 352 has sufficient tokens to support the incoming packets. The packet-marking system 350 marks the incoming packet 358-1 green, while the color-exchange queue 354 holds a plurality of previously received packets 358-2, 358-3, 358-4, and 358-5, e.g., also marked green. The packets 358 within the queue can be any mix of packet types (e.g., I-packets, P-packets, and B-packets) with any mix of drop-precedence markers; that is, the queue 354 can hold packets with varying levels of priority and with different color markings.

Figure 9:
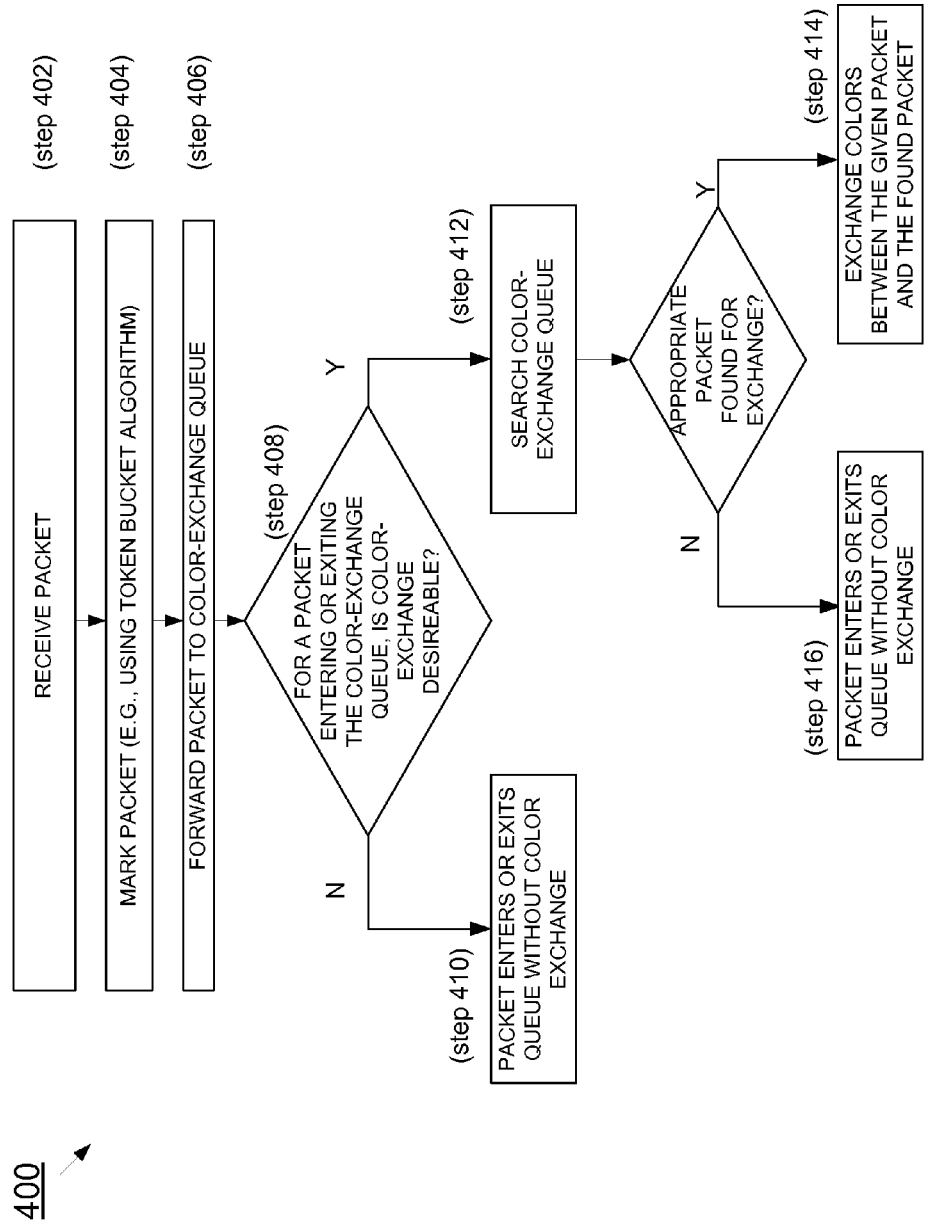
FIG. 9 is a flow diagram of an embodiment of a process for marking incoming packets using the token bucket and color-exchange queue of FIG. 8.

FIG. 9 shows an embodiment of a process 400 performed by the packet-marking system 350 of FIG. 8 for marking and policing incoming packets 358 of a multi-priority stream in accordance with the invention. In brief overview, the packet-marking system 350 can change the marking of a given packet—as determined by the token bucket 352 and marked by the packet marker 360—either as the given packet enters the color-exchange queue 354 or is about to exit the queue 354 for forwarding over the network. To change the mark for a given packet, the packet-marking system 350 exchanges the mark of that packet with another packet in the queue. Color exchanges occur between high-priority packets marked with high drop precedence and low-priority packets marked with low drop precedence.

More specifically, consider that a packet of a multi-priority stream arrives (step 402) at the packet-marking system 350. Again, for illustration purposes, consider that the multi-priority traffic is a video stream consisting of I-, P-, and B-packets. The packet marker 360 marks (step 404) the packet according to the traffic condition at the time the packet arrives—as determined by the token bucket 352. The packet passes (step 406) to the color-exchange queue 354.

Whenever a given packet is about to enter or exit the color-exchange queue 354, the packet-marking system 350 determines (step 408) whether to perform a color exchange based on the type and current marking of the given packet. If a color-exchange is not needed, e.g., a green I-packet or red B-packet, the packet enters or exits (step 410) the queue without any change to its marking. If a color exchange is sought-for, the packet-marking system searches (step 412) the queue 354 for a packet that is lower in priority than the given packet and marked with a better drop precedence. If a packet satisfying the criteria is found, the packet-marking system 350 performs (step 414) the color-exchange between the given packet and the selected packet. This exchange of markings does not affect the current position of these packets in the queue. In no packet in the queue satisfies the criteria, the packet enters or exits (step 416) the queue with its marking unchanged.

For example, for video traffic with three colors, green, yellow, and red, here listed in low-to-high drop precedence order, incoming or exiting red I-packets are swapped with green or yellow P- or B-packets, incoming or exiting red P-packets are swapped with green or yellow B-packets, incoming or exiting yellow I-packets are swapped with green P- or B-packets, and incoming or exiting yellow P-packets are swapped with green B-packets. Packets that are candidates for a color exchange with a given packet can be at any position within the color-exchange queue 354. Preferably, the packet selected for a color exchange is positionally nearest to the given packet within the queue. The following illustrates one specific example of a process for selecting packets for a color exchange:

If the given packet is an I-packet and is currently marked green, then there is no change to the packet marking. The packet enters and eventually leaves the color-exchange queue 354 with the low-drop precedence. This result is illustrated in FIG. 8.

If the I-packet received a yellow mark from the token bucket 352, then the color-exchange queue 354 is searched for two types of packets closest in color to the I-packet: a green B-packet or a green P-packet. If a green B-packet is found, the marking of the B-packet is exchanged with that of the I-packet: the I-packet becomes green, and the B-packet yellow. If no B-packet is found, and a green P-packet is found, the marks are swapped: the I-packet becomes green and the P-packet becomes yellow. If neither a green B-packet nor green P-packet is found, no marking exchange occurs, and the I-packet enters the queue 354 with its present drop precedence (i.e., yellow).

If instead, the I-packet is red, the packet-marking system 350 searches the color-exchange queue 354 for four types of packets closest to the I-packet: (1) a green B-packet; (2) a yellow B-packet; (3) a green P-packet; and (4) a yellow P-packet. If a green B-packet is found, then the markings of the high-priority I-packet and the B-packet are swapped. If both a yellow B-packet and a green P-packet are found in the color-exchange queue 354, then the I-packet becomes green, the P-packet becomes yellow, and the B-packet becomes red in accordance with their respective levels of priority. If instead, a green P-packet (and no yellow B-packet) is found, then the markings of the I-packet and the P-packet are swapped. Alternatively, if instead, a yellow B-packet is found (and no green P-packet), then the markings of the I-packet and the B-packet are swapped. Or, if a yellow P-packet is found (and no green or yellow B-packet), then the markings of the I-packet and the P-packet are swapped. If none of such combinations of P- and B-packets is found, no change occurs to the marking of the I-packet.

FIG. 10A and FIG. 10B show an exemplary situation in which an incoming I-packet 358-1 is marked red and, as the I-packet 358-1 is about to enter the color-exchange queue 354, the red marking of the I-packet 358-1 is exchanged with a green B-packet 358-4 already present in the queue 354. As a result, the I-packet 358-1 enters the color-exchange queue with a green marking, and the B-packet 358-4 exits the queue 354 with a red marking.

FIG. 10C and FIG. 10D illustrate another exemplary situation in which a red I-packet 358-5 is about to exit the color-exchange queue 354. Here, the red marking of the I-packet 358-5 is exchanged with a green B-packet 358-2 already present in the queue 354. As a result, the I-packet 358-5 exits the color-exchange queue 354 with a green marking, and the B-packet 358-2 resides in the queue 354 with a red marking.

If the incoming packet is a P-packet and is marked green, then no change occurs to the packet marking. The packet enters the color-exchange queue 354, or if already in the queue, is forwarded with the green marking.

If the P-packet has a yellow marking, then the packet-marking system 354 searches color-exchange queue for a green B-packet packet nearest to the P-packet in the queue. If a green B-packet is found, the markings of the P- and B-packets are swapped. If a green B-packet is not found, no change occurs to the mark of the P-packet, and the P-packet enters or leaves the color-exchange queue 354 with its present drop precedence.

If instead, the P-packet is red, the packet-marking system 354 searches for two types of packets closest to P-packet: (1) a green B-packet; and (2) a yellow B-packet. If a green B-packet is found, then the markings of the P-packet and the B-packet are swapped. If a yellow B-packet is found in the color-exchange queue 354, then the P-packet becomes yellow, the B-packet becomes red. If neither a green B-packet nor a yellow B-packet is found, no change occurs to the P-packet mark.

Lastly, if the packet that is about to enter or leave the queue is a B-packet, there is no change to the marking of the B-packet.

This embodiment of the color-exchange marking process 400 for an incoming packet X (or, an outgoing packet X) can be expressed with the following pseudo-code:

```
{/start
for an I-packet{
if the packet is marked green, then no change;
else if the packet is marked yellow, then search the queue for two types of packets closest to X; a green B-packet, gB, and a green P-packet, gP, and
proceed as follows:{
if a gB is found, then swap colors of gB and X,
else if a gY is found, then swap colors of gY and X,
else, no change.}
else if X is red, then search the queue for four types of packets closest to X; a green B-packet, gB, a yellow B-packet, yB, a green P-packet, gP, and a yellow P-packet, yP, and proceed as follows:{
if a gB is found, then swap colors of gB and X,
else if both a gP and a yB are found, then X gets green, gP gets yellow and yB gets red,
else if a gP is found, then swap colors of gP and X,
else if a yB is found, then swap colors of yB and X,
else if a yP is found, then swap colors of yP and X,
else, no change.}
}/for I-packets
else if X is a P-packet, then{
if X is green, then no change.
else if X is yellow, then search the queue for a green B-packet, gB, closest to X, and proceed as follows:{
if a gB is found, then swap colors of gB and X,
else, no change.}
else if X is red, then search the queue for two types of packets closest to X; a green B-packet, gB, and a yellow B-packet, yB, and proceed as follows:{
if a gB is found, then swap colors of gB and X,
else if a yB is found, then swap colors of yB and X,
else, no change.}
}/for P-packets
else, X is a B-packet, no change.
}/end
```

The principles of the invention can apply to more complicated or simpler versions of this color-exchange process, in accordance with service and system requirements. Moreover, the token bucket parameters and queue size can be set according to the desired amount of flexibility for each priority level, and to the traffic profile.

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. In a communication network, a method of marking a packet of a multi-priority stream to establish a drop precedence of the packet, the method comprising:
    determining that the packet is non-conforming with respect to a traffic profile;
    determining whether bandwidth can be borrowed for the non-conforming packet;
    when bandwidth can be borrowed for the non-conforming packet, associating the non-conforming packet with a lower drop precedence; and
    when bandwidth cannot be borrowed for the non-conforming packet, associating the non-conforming packet with a higher drop precedence.

2. The method of claim 1, further comprising determining whether bandwidth for the first packet can be borrowed by examining a loan bucket to determine whether a number of tokens in the loan bucket is less than a predetermined threshold.

3. The method of claim 2, further comprising adding at least one token to the loan bucket when the non-conforming packet is associated with a lower drop precedence.

4. The method of claim 2, wherein the non-conforming packet is a higher priority packet, the method further comprising associating a conforming lower priority packet with a higher drop precedence responsive to determining that bandwidth has been borrowed for the non-conforming packet.

5. The method of claim 4, wherein determining that bandwidth has been borrowed for the non-conforming packet comprises examining the loan bucket to determine whether the loan bucket contains any tokens.

6. The method of claim 4, further comprising forwarding the non-conforming packet over the network before the lower priority conforming packet is received.

7. The method of claim 4, wherein associating the non-conforming higher priority packet with a lower drop precedence and associating the conforming lower priority packet with a higher drop precedence further comprises:
    marking the non-conforming higher priority packet with a higher drop precedence;
    marking the conforming lower priority packet with a lower drop precedence; and
    exchanging the higher drop precedence marking of the non-conforming higher priority packet with the lower drop precedence marking of the conforming lower priority packet.

8. The method of claim 7, further comprising placing both the non-conforming higher priority packet and the conforming lower priority packet in a queue for a fixed period.

9. The method of claim 7, wherein the higher drop precedence marking of the non-conforming higher priority packet is exchanged with the lower drop precedence marking of the conforming lower priority packet when one of the non-conforming higher priority packet and the conforming lower priority packet enters the queue.

10. The method of claim 7, wherein the higher drop precedence marking of the non-conforming higher priority packet is exchanged with the lower drop precedence marking of the conforming lower priority packet when one of the non-conforming higher priority packet and the conforming lower priority packet exits the queue.

11. The method of claim 1, further comprising adding at least one token to a loan bucket when the non-conforming packet is associated with a lower drop precedence.

12. The method of claim 1, wherein the non-conforming packet is a higher priority packet, the method further comprising associating a conforming lower priority packet with a higher drop precedence responsive to determining that bandwidth has been borrowed for the non-conforming packet.

13. The method of claim 12, wherein determining that bandwidth has been borrowed for the non-conforming packet further comprises examining a loan bucket to determine whether the loan bucket contains any tokens.

14. The method of claim 12, further comprising forwarding the non-conforming packet over the network before the lower priority conforming packet is received.

15. The method of claim 12, wherein associating the non-conforming higher priority packet with a lower drop precedence and associating the conforming lower priority packet with a higher drop precedence further comprises:

marking the non-conforming higher priority packet with a higher drop precedence;

marking the conforming lower priority packet with a lower drop precedence; and exchanging the higher drop precedence marking of the non-conforming higher priority packet with the lower drop precedence marking of the conforming lower priority packet.

16. The method of claim 15, further comprising placing both the non-conforming higher priority packet and the conforming lower priority packet in a queue for a fixed period.

17. The method of claim 15, wherein the higher drop precedence marking of the non-conforming higher priority packet is exchanged with the lower drop precedence marking of the conforming lower priority packet when one of the non-conforming higher priority packet and the conforming lower priority packet enters the queue.

18. The method of claim 15, wherein the higher drop precedence marking of the non-conforming higher priority packet is exchanged with the lower drop precedence marking of the conforming lower priority packet when one of the non-conforming higher priority packet and the conforming lower priority packet exits the queue.

* * * * *